(12) United States Patent
Klivington (10) Patent No.: US 7,548,583 B2
(45) Date of Patent: Jun. 16, 2009

(54) GENERATION AND USE OF MASKS IN MPEG VIDEO ENCODING TO INDICATE NON-ZERO ENTRIES IN TRANSFORMED MACROBLOCKS

(75) Inventor: Jason Klivington, Portland, OR (US)

(73) Assignee: Apple Inc., Cupertino, CA (US)

( * ) Notice: Subject to any disclaimer, the term of this patent is extended or adjusted under 35 U.S.C. 154(b) by 466 days.

(21) Appl. No.: 11/200,949

(22) Filed: Aug. 9, 2005

(65) Prior Publication Data

US 2006/0034368 A1   Feb. 16, 2006

Related U.S. Application Data

(63) Continuation of application No. 10/041,535, filed on Jan. 7, 2002, now Pat. No. 6,985,529.

(51) Int. Cl.
 *H04B 1/66* (2006.01)
(52) U.S. Cl. .................................. 375/240.2
(58) Field of Classification Search ............ 375/240.01, 375/240.11, 240.13, 240.16, 240.17, 240.19; *H04B 1/66*
 See application file for complete search history.

(56) References Cited

U.S. PATENT DOCUMENTS 4,821,119 A * 4/1989 Gharavi .................. 375/240.16
5,657,086 A * 8/1997 Tahara et al. ............ 375/240.13
5,659,362 A * 8/1997 Kovac et al. ............. 348/384.1

(Continued)

OTHER PUBLICATIONS

"Information Technology—Coding of Moving Pictures and Associated Audio for Digital Storage Media at Up to About 1,5 Mbit/s—Part 2: Video," International Standard, ISO/IEC # 11172, Part 2, 1993, pp. i-113, Published by ISO/IEC, Switzerland.

(Continued)

*Primary Examiner*—Tung Vo
(74) *Attorney, Agent, or Firm*—Blakely, Sokoloff, Taylor & Zafman LLP (57) ABSTRACT

During Motion Picture Experts Group (MPEG) video encoding a two-dimensional discrete cosine transform (DCT) is performed on data representing an original image. The resulting coefficients are then quantized, which typically results in many zero coefficients. Because of the nature of most video data, most higher-order coefficients are typically zero and the lower-order coefficients (i.e., those grouped towards the upper left of the matrix) are more likely to be non-zero. To reduce the lengths of runs among the lower-order coefficients, the coefficients can be encoded in a zig-zag pattern. In one embodiment, the zig-zag pattern is maintained and one or more masks are generated based on the output of the quantization phase. The one or more masks are used to identify the coefficients within the matrix that are non-zero. This reduces the number of accesses to memory required to encode the non-zero coefficients and runs of zero coefficients.

30 Claims, 4 Drawing Sheets

U.S. PATENT DOCUMENTS

| | | | | | |
|---|---|---|---|---|---|
| 5,737,020 | A | * | 4/1998 | Hall et al. | 375/240.2 |
| 5,821,887 | A | * | 10/1998 | Zhu | 341/67 |
| 5,959,872 | A | * | 9/1999 | Son | 708/402 |
| 6,351,492 | B1 | * | 2/2002 | Kim | 375/240.08 |
| 6,373,412 | B1 | * | 4/2002 | Mitchell et al. | 341/65 |
| 6,452,970 | B1 | * | 9/2002 | Kaup | 375/240.1 |
| 6,473,463 | B2 | * | 10/2002 | Agarwal | 375/240.24 |
| 6,529,554 | B1 | * | 3/2003 | Craver | 375/240.23 |
| 6,731,686 | B1 | * | 5/2004 | Sudharsanan et al. | 375/240.25 |
| 6,985,529 | B1 | * | 1/2006 | Klivington | 375/240.2 |

OTHER PUBLICATIONS

"Information Technology—Coding of Moving Pictures and Associated Audio for Digital Storage Media at Up to About 1,5 Mbit/s—Part 2: Video," Technical Corrigendum 1, International Standard, ISO/IEC # 11172, Part 2, 1996, pp. 1-2, Published by ISO/IEC, Switzerland.

"Information Technology—Coding of Moving Pictures and Associated Audio for Digital Storage Media at Up to About 1,5 Mbit/s—Part 2: Video," Technical Corrigendum 2, International Standard, ISO/IEC # 11172, Part 2, 1999, pp. 1-5, Published by ISO/IEC, Switzerland.

Office Action for U.S. Appl. No. 10/041,535 mailed Aug. 16, 2004, 8 pgs.

* cited by examiner

GENERATION AND USE OF MASKS IN MPEG VIDEO ENCODING TO INDICATE NON-ZERO ENTRIES IN TRANSFORMED MACROBLOCKS

This application is a continuation application of U.S. patent application Ser. No. 10/041,535, filed Jan. 7, 2002 now U.S. Pat. No. 6,985,529.

FIELD

The invention relates to video encoding. More specifically, the invention relates to use of a non-traditional Zig-Zag Transform for Motion Picture Experts Group (MPEG) video encoding.

BACKGROUND

Figure 1:
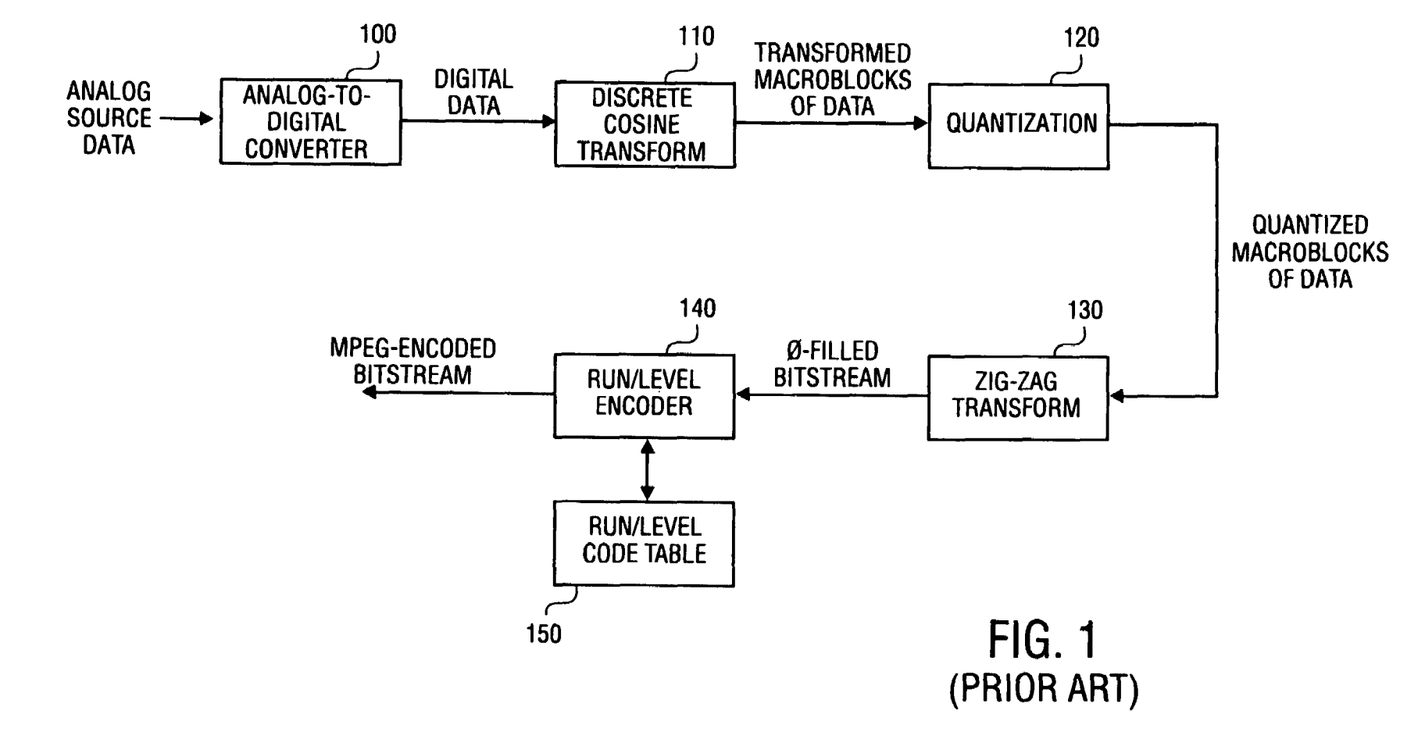
FIG. 1 is a block diagram of a basic Motion Picture Experts Group (MPEG) encoding scheme.

FIG. 1 is a block diagram of a basic Motion Picture Experts Group (MPEG) encoding scheme. The video portion of MPEG-1 encoding is described in detail in International Standards Organization (ISO) document IS 11172, Part 2, "Video" Published Jan. 8, 1990. Subsequent versions of the MPEG video encoding standards (e.g., MPEG-2, MPEG-4) also exist.

If necessary, analog source data is converted by analog-to-digital converter 100 to digital data. The digital data is processed using discrete cosine transform 110. In general, a discrete cosine transform (DCT) is a technique for decomposing a block of data into a weighted sum of spatial frequencies. Each spatial frequency pattern has a corresponding coefficient, which is the amplitude used to represent the contribution of the spatial frequency pattern in the block of data being analyzed. DCT operations and the various implementations are known in the art. See, for example, William B. Pennebaker and Joan L. Mitchell, "JPEG: Still Image Data Compression Standard," Van Nostrand Reinhold, 1993 or K. R. Rao and P. Yip, "Discrete Cosine Transform," Academic Press, 1990.

In a typical MPEG encoding scheme, a frame of an image is divided into macroblocks. Each 16 pixel by 16 pixel macroblock (which is further divided into four 8 by 8 blocks) has 256 bytes of luminance (Y) data for the 256 pixels of the macroblock. The blue chrominance (U) and red chrominance (V) data for the pixels of the macroblock are communicated at ¼ resolution, or 64 bytes of U data and 64 byes of V data for the macroblock and filtering is used to blend pixel colors.

The macroblock data output by DCT 110 is further processed by quantization 120. A DCT coefficient is quantized by dividing the DCT coefficient by a nonzero positive integer called a quantization value and rounding the quotient to the nearest integer. See, for example, Joan L. Mitchell, et al., "MPEG Video Compression Standard," Kluwer Academic Publishers, 1996, pages 46-49. The quantized macroblock coefficients are converted from a two-dimensional format (e.g., 16×16 block) to a one-dimensional sequence using a zig-zag scanning order. The sequence resulting from zig-zag transform 130 is a compressible bitstream.

The bitstream output by zig-zag transform 130 is run/level encoded by run/level encoder 140, which converts strings of zeros and non-zero coefficients output from zig-zag transform 130 into number pairs. Strings of number pairs are the MPEG-encoded bitstream that carries sufficient information to reconstruct a motion video.

Run/level encoding requires many comparison operations to determine whether a coefficient is zero or non-zero. The results of the comparison are used for conditional branch operations. In many video data streams most coefficients are zero after quantization. Because non-zero entries are used for run/level encoding the process of checking each coefficient to determine whether the coefficient is non-zero and the associated branching required is inefficient.

SUMMARY

Techniques for Motion Picture Experts Group (MPEG) video encoding are described. A set of coefficients representing video data is transformed from a first order to a second order. A mask indicating whether the individual coefficients in the second order are non-zero is generated. The number of leading zero coefficients for the non-zero coefficients is determined using the mask. The non-zero coefficients are retrieved. The set of coefficients are encoded based on the number of leading zero coefficients determined from the mask and corresponding non-zero entries.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Techniques for zig-zag encoding video data according to Motion Picture Experts Group (MPEG) standards are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

During MPEG video encoding a two-dimensional discrete cosine transform (DCT) is performed on data representing an original image. The resulting coefficients are then quantized, which typically results in many zero coefficients. Because of the nature of most video data, most higher-order coefficients are typically zero and the lower-order coefficients (i.e., those grouped towards the upper left of the matrix) are more likely to be non-zero. To reduce the lengths of runs among the lower-order coefficients, the coefficients can be encoded in a zig-zag pattern. In one embodiment, the zig-zag pattern is maintained and one or more masks are generated based on the output of the quantization operation. The one or more masks are used to identify and retrieve the coefficients within the matrix that are non-zero. This reduces the number of accesses to memory required to encode the non-zero coefficients and runs of zero coefficients, which improves the efficiency of the encoding process.

Figure 2:
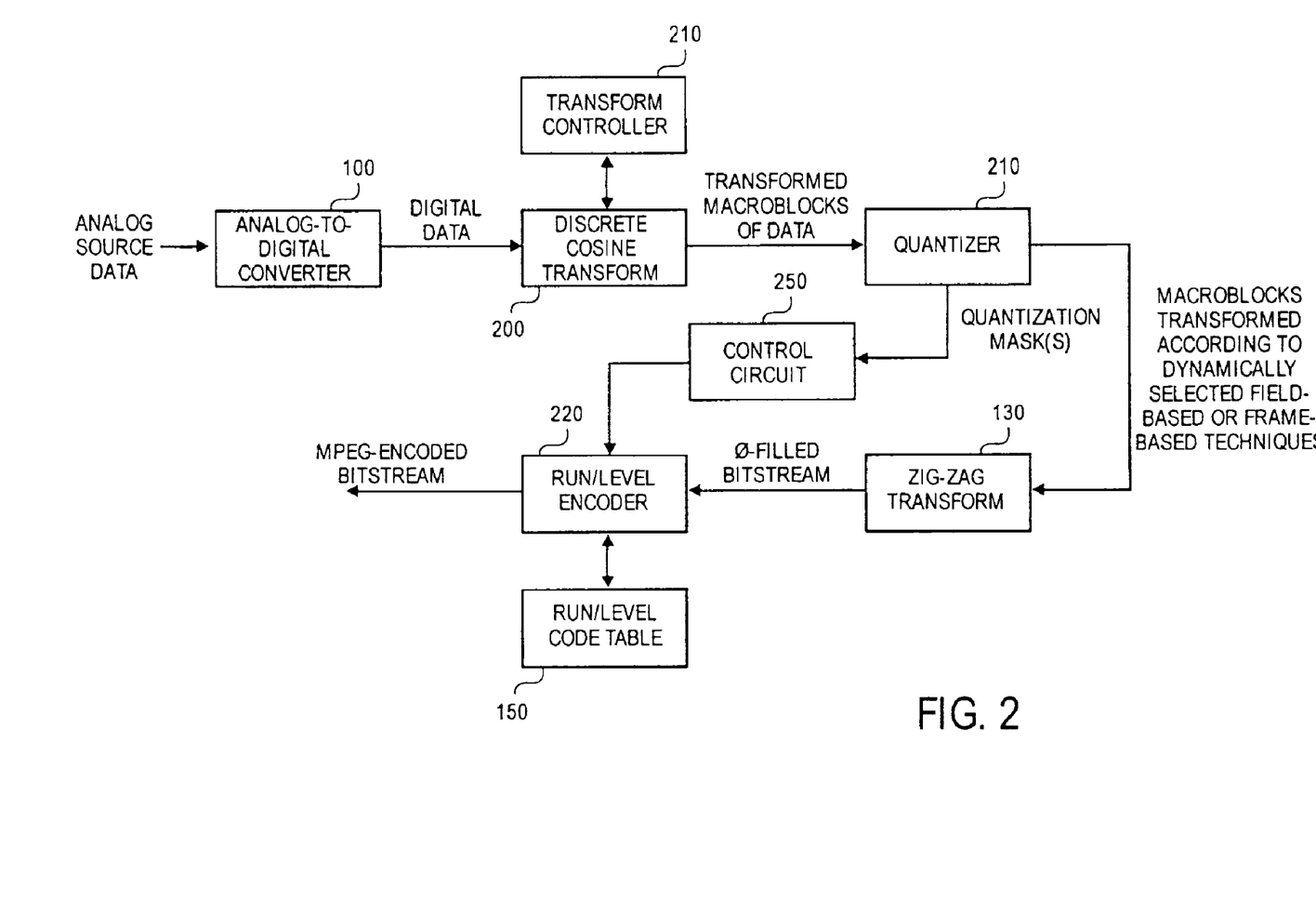
FIG. 2 is a block diagram of a MPEG encoding scheme in which a coefficient location mask is used to facilitate zig-zag encoding.

FIG. 2 is a block diagram of a MPEG encoding scheme in which a coefficient location (or quantization) mask(s) is used to facilitate zig-zag encoding. The various components of the block diagram of FIG. 2 can be implemented as hardware, software or a combination of hardware and software. Thus, the technique for using a coefficient location mask to facilitate zig-zag encoding as well as other portions of MPEG encoding can be any combination of hardware and software.

Analog source data is converted to digital data by analog to digital converter 100. Analog to digital converter 100 can be any analog to digital converter known in the art. If digital data is received, conversion by analog to digital converter 100 is not necessary. The digital data is used as input to discrete cosine transform 200. Various techniques for accomplishing DCT operations are known in the art, and any appropriate technique can be used to convert the digital data to transformed macroblocks of data.

The transformed macroblocks of data are input to quantizer 210, which performs quantization by dividing each of the coefficients generated by the DCT by a quantization value and the result is rounded. The specific quantization value to be used is independent of the techniques described herein and therefore not described in detail. Quantizer 210 also generates one or more quantization masks as described in greater detail below.

In MPEG encoding, a two-dimensional DCT is performed on 8×8 blocks of pixel data. The resulting coefficients are then quantized, which typically results in many zero coefficients. These quantized coefficients are then encoded using run/level encoding, which encodes the lengths of runs of zeros and the value of the non-zero coefficient that terminates the run of zeros. Because of the nature of typical video material, most higher-order coefficients are zero, while lower-order coefficients are more likely to be non-zero.

To minimize the lengths of these runs, coefficients are encoded in a zig-zag order, which groups the lower-order (and therefore more likely non-zero) coefficients together and the higher-order coefficients at the end of the sequence. The zig-zag transform is performed at processing block 130. A zig-zag conversion of an 8×8 matrix having an original order of:

$$O = \begin{bmatrix} 0 & 1 & 2 & 3 & 4 & 5 & 6 & 7 \\ 8 & 9 & 10 & 11 & 12 & 13 & 14 & 15 \\ 16 & 17 & 18 & 19 & 20 & 21 & 22 & 23 \\ 24 & 25 & 26 & 27 & 28 & 29 & 30 & 31 \\ 32 & 33 & 34 & 35 & 36 & 37 & 38 & 39 \\ 40 & 41 & 42 & 43 & 44 & 45 & 46 & 47 \\ 48 & 49 & 50 & 51 & 52 & 53 & 54 & 55 \\ 56 & 57 & 58 & 59 & 60 & 61 & 62 & 63 \end{bmatrix}$$

is converted to an order of:

$$Z = \begin{bmatrix} 0 & 1 & 5 & 6 & 14 & 15 & 27 & 28 \\ 2 & 4 & 7 & 13 & 16 & 26 & 29 & 42 \\ 3 & 8 & 12 & 17 & 25 & 30 & 41 & 43 \\ 9 & 11 & 18 & 24 & 31 & 40 & 44 & 53 \\ 10 & 19 & 23 & 32 & 39 & 45 & 52 & 54 \\ 20 & 22 & 33 & 38 & 46 & 51 & 55 & 60 \\ 21 & 34 & 37 & 47 & 50 & 56 & 59 & 61 \\ 35 & 36 & 48 & 49 & 57 & 58 & 62 & 63 \end{bmatrix}$$

This conversion will usually result in a few short runs at the beginning of the sequence with the sequence typically ending with a long run of zeros. The run/level pairs of the sequence are encoded using a Huffman table with shorter entries given smaller entries so this strategy of run/level ordering results in a smaller, more concise variable length coding of the data. The zig-zag transformed coefficients are stored in memory.

The generation of this zig-zag order run/level encoding can be relatively expensive and inefficient because it can involve conditional code and double indexing using lookup tables. This is even more inefficient in a superscaler architecture because most common implementations are highly sequential and provide little opportunity for parallelism.

Described herein is a vector-based technique that provides generation of a mask that represents the non-zero elements of the array of data to be zig-zag transformed. The mask enables more efficient run/level encoding because use of the mask reduces the conditionality of the reordering code, which results in faster, more efficient execution of the reordering.

The transposed zig-zag array is $$Z' = \begin{bmatrix} 0 & 2 & 3 & 9 & 10 & 20 & 21 & 35 \\ 1 & 4 & 8 & 11 & 19 & 22 & 34 & 36 \\ 5 & 7 & 12 & 18 & 23 & 33 & 37 & 48 \\ 6 & 13 & 17 & 24 & 32 & 38 & 47 & 49 \\ 14 & 16 & 25 & 31 & 39 & 46 & 50 & 57 \\ 15 & 26 & 30 & 40 & 45 & 51 & 56 & 58 \\ 27 & 29 & 41 & 44 & 52 & 55 & 59 & 62 \\ 28 & 42 & 43 & 53 & 54 & 60 & 61 & 63 \end{bmatrix}$$

In one embodiment, a 64-bit mask that represents all non-zero coefficients in Z' is generated during quantization. If the mask is a 64-bit value, the value for the first element (most significant bit) is $2^{63}$ and the value for the last element (least significant bit) is $2^0$. The bit values for each element of Z' are given by:

$$L = \begin{bmatrix} 2^{63} & 2^{61} & 2^{60} & 2^{54} & 2^{53} & 2^{43} & 2^{42} & 2^{28} \\ 2^{62} & 2^{59} & 2^{55} & 2^{52} & 2^{44} & 2^{41} & 2^{29} & 2^{27} \\ 2^{58} & 2^{56} & 2^{51} & 2^{45} & 2^{40} & 2^{30} & 2^{26} & 2^{15} \\ 2^{57} & 2^{50} & 2^{46} & 2^{39} & 2^{31} & 2^{25} & 2^{16} & 2^{14} \\ 2^{49} & 2^{47} & 2^{38} & 2^{32} & 2^{24} & 2^{17} & 2^{13} & 2^{6} \\ 2^{48} & 2^{37} & 2^{33} & 2^{23} & 2^{18} & 2^{12} & 2^{7} & 2^{5} \\ 2^{36} & 2^{34} & 2^{22} & 2^{19} & 2^{11} & 2^{8} & 2^{4} & 2^{1} \\ 2^{35} & 2^{21} & 2^{20} & 2^{10} & 2^{9} & 2^{3} & 2^{2} & 2^{0} \end{bmatrix}$$

This matrix can be grouped and factored into:

$$M_1 = 2^{b_1} \begin{bmatrix} 2^{13} & 2^{11} \\ 2^{12} & 2^{9} \\ 2^{8} & 2^{6} \\ 2^{7} & 2^{0} \end{bmatrix} \quad M_2 = 2^{b_2} \begin{bmatrix} 2^{21} & 2^{15} \\ 2^{16} & 2^{13} \\ 2^{12} & 2^{6} \\ 2^{7} & 2^{0} \end{bmatrix}$$

$$M_3 = 2^{b_3} \begin{bmatrix} 2^{28} & 2^{18} \\ 2^{19} & 2^{16} \\ 2^{15} & 2^{5} \\ 2^{6} & 2^{0} \end{bmatrix} \quad M_4 = 2^{b_4} \begin{bmatrix} 2^{28} & 2^{14} \\ 2^{15} & 2^{13} \\ 2^{12} & 2^{1} \\ 2^{2} & 2^{0} \end{bmatrix}$$

$$M_5 = 2^{b_5} \begin{bmatrix} 2^{28} & 2^{26} \\ 2^{27} & 2^{16} \\ 2^{15} & 2^{13} \\ 2^{14} & 2^0 \end{bmatrix} \quad M_6 = 2^{b_6} \begin{bmatrix} 2^{28} & 2^{22} \\ 2^{23} & 2^{13} \\ 2^{12} & 2^9 \\ 2^{10} & 2^0 \end{bmatrix}$$

$$M_7 = 2^{b_7} \begin{bmatrix} 2^{24} & 2^{17} \\ 2^{18} & 2^{12} \\ 2^{11} & 2^8 \\ 2^9 & 2^3 \end{bmatrix} \quad M_8 = 2^{b_8} \begin{bmatrix} 2^{13} & 2^6 \\ 2^7 & 2^5 \\ 2^4 & 2^1 \\ 2^2 & 2^0 \end{bmatrix}$$

with $b_1=50$, $b_2=39$, $b_3=25$, $b_4=14$, $b_5=21$, $b_6=10$, $b_7=0$, and $b_8=0$.

Factoring further provides:

$$M_1 = 2^{b_1} \begin{bmatrix} 2^{13} \times 2^0 & 2^{11} \times 2^0 \\ 2^{12} \times 2^0 & 2^9 \times 2^0 \\ 2^8 \times 2^0 & 2^6 \times 2^0 \\ 2^7 \times 2^0 & 2^0 \times 2^0 \end{bmatrix} \quad M_2 = 2^{b_2} \begin{bmatrix} 2^{15} \times 2^6 & 2^{15} \times 2^0 \\ 2^{15} \times 2^1 & 2^{13} \times 2^0 \\ 2^{12} \times 2^0 & 2^6 \times 2^0 \\ 2^7 \times 2^0 & 2^0 \times 2^0 \end{bmatrix}$$

$$M_3 = 2^{b_3} \begin{bmatrix} 2^{15} \times 2^{13} & 2^{15} \times 2^3 \\ 2^{15} \times 2^4 & 2^{15} \times 2^1 \\ 2^{15} \times 2^0 & 2^5 \times 2^0 \\ 2^6 \times 2^0 & 2^0 \times 2^0 \end{bmatrix} \quad M_4 = 2^{b_4} \begin{bmatrix} 2^{15} \times 2^{13} & 2^{14} \times 2^0 \\ 2^{15} \times 2^0 & 2^{13} \times 2^0 \\ 2^{12} \times 2^0 & 2^1 \times 2^0 \\ 2^2 \times 2^0 & 2^0 \times 2^0 \end{bmatrix}$$

$$M_5 = 2^{b_5} \begin{bmatrix} 2^{15} \times 2^{13} & 2^{15} \times 2^{11} \\ 2^{15} \times 2^{12} & 2^{15} \times 2^1 \\ 2^{15} \times 2^0 & 2^{13} \times 2^0 \\ 2^{14} \times 2^0 & 2^0 \times 2^0 \end{bmatrix} \quad M_6 = 2^{b_6} \begin{bmatrix} 2^{15} \times 2^{13} & 2^{15} \times 2^7 \\ 2^{15} \times 2^8 & 2^{13} \times 2^0 \\ 2^{12} \times 2^0 & 2^9 \times 2^0 \\ 2^{10} \times 2^0 & 2^0 \times 2^0 \end{bmatrix}$$

$$M_7 = 2^{b_7} \begin{bmatrix} 2^{15} \times 2^9 & 2^{15} \times 2^2 \\ 2^{15} \times 2^3 & 2^{12} \times 2^0 \\ 2^{11} \times 2^0 & 2^8 \times 2^0 \\ 2^9 \times 2^0 & 2^3 \times 2^0 \end{bmatrix} \quad M_8 = 2^{b_8} \begin{bmatrix} 2^{13} \times 2^0 & 2^6 \times 2^0 \\ 2^7 \times 2^0 & 2^5 \times 2^0 \\ 2^4 \times 2^0 & 2^1 \times 2^0 \\ 2^2 \times 2^0 & 2^0 \times 2^0 \end{bmatrix}$$

Thus, each $M_n$ can be written as $M_n = N_n \times P_n \times 2^{b_n}$ where $$N_1 = \begin{bmatrix} 2^{13} & 2^{11} \\ 2^{12} & 2^9 \\ 2^8 & 2^6 \\ 2^7 & 2^0 \end{bmatrix} \quad N_2 = \begin{bmatrix} 2^{15} & 2^{15} \\ 2^{15} & 2^{13} \\ 2^{12} & 2^6 \\ 2^7 & 2^0 \end{bmatrix} \quad N_3 = \begin{bmatrix} 2^{15} & 2^{15} \\ 2^{15} & 2^{15} \\ 2^{15} & 2^5 \\ 2^6 & 2^0 \end{bmatrix}$$

$$N_4 = \begin{bmatrix} 2^{15} & 2^{14} \\ 2^{15} & 2^{13} \\ 2^{12} & 2^1 \\ 2^2 & 2^0 \end{bmatrix} \quad N_5 = \begin{bmatrix} 2^{15} & 2^{15} \\ 2^{15} & 2^{15} \\ 2^{15} & 2^{13} \\ 2^{14} & 2^0 \end{bmatrix} \quad N_6 = \begin{bmatrix} 2^{15} & 2^{15} \\ 2^{15} & 2^{13} \\ 2^{12} & 2^9 \\ 2^{10} & 2^0 \end{bmatrix}$$

$$N_7 = \begin{bmatrix} 2^{15} & 2^{15} \\ 2^{15} & 2^{12} \\ 2^{11} & 2^8 \\ 2^9 & 2^3 \end{bmatrix} \quad N_8 = \begin{bmatrix} 2^{13} & 2^6 \\ 2^7 & 2^5 \\ 2^4 & 2^1 \\ 2^{72} & 2^0 \end{bmatrix}$$

$$P_1 = \begin{bmatrix} 2^0 & 2^0 \\ 2^0 & 2^0 \\ 2^0 & 2^0 \\ 2^0 & 2^0 \end{bmatrix} \quad P_2 = \begin{bmatrix} 2^6 & 2^0 \\ 2^1 & 2^0 \\ 2^0 & 2^0 \\ 2^0 & 2^0 \end{bmatrix} \quad P_3 = \begin{bmatrix} 2^{13} & 2^3 \\ 2^4 & 2^1 \\ 2^0 & 2^0 \\ 2^0 & 2^0 \end{bmatrix}$$

$$P_4 = \begin{bmatrix} 2^{13} & 2^0 \\ 2^0 & 2^0 \\ 2^0 & 2^0 \\ 2^0 & 2^0 \end{bmatrix} \quad P_5 = \begin{bmatrix} 2^{13} & 2^{11} \\ 2^{12} & 2^1 \\ 2^0 & 2^0 \\ 2^0 & 2^0 \end{bmatrix} \quad P_6 = \begin{bmatrix} 2^{13} & 2^7 \\ 2^3 & 2^0 \\ 2^0 & 2^0 \\ 2^0 & 2^0 \end{bmatrix}$$

$$P_7 = \begin{bmatrix} 2^9 & 2^2 \\ 2^3 & 2^0 \\ 2^0 & 2^0 \\ 2^0 & 2^0 \end{bmatrix} \quad P_8 = \begin{bmatrix} 2^0 & 2^0 \\ 2^0 & 2^0 \\ 2^0 & 2^0 \\ 2^0 & 2^0 \end{bmatrix}$$

Thus, every element of $N_n$ and $P_n$ can be expressed as a product of two 16-bit values and one 64-bit value. Summing all elements of $N_n \times P_n \times 2^{b_n}$ results in $2^{64}-1$ or a 64-bit value with all bits set.

Starting with a matrix Q of quantized coefficients, a bitmap, T, is generated that indicates all non-zero coefficients of Q in the zig-zag order indicated in Z'. The bitmap T can be determined by zeroing all elements in the matrix L that correspond to zero elements in Q, then summing these elements. This can also be accomplished by zeroing the corresponding elements in the submatricies $P_n$ and then performing the multiplications $N_n \times P_n \times 2^{b_n}$ for all n. The sum of these products is the desired bitmask.

In one embodiment, the bitmask is generated at the quantization operation. In an alternate embodiment, the bitmask is generated after the quantization operation. In one embodiment, vector operations for masking, selection and multiply-sum can be used to generate two vectors $V_1$ and $V_2$, each of which consists of four 32-bit values.

The elements of $V_1$ correspond to the sums of submatricies $M_1$ through $M_4$, respectively. The elements of $V_2$ correspond to the sums of submatricies $M_5$ through $M_8$, respectively. Each of the eight 32-bit elements of $V_1$ and $V_2$ can then be shifted left the number of bits corresponding to $b_n$ in order to position the bits at the correct offset in the bitmap. All eight of these elements can then be summed using a bitwise OR operation.

Factoring the submatricies $M_n$ into $N_n \times P_n$ is motivated by the fact that, in one embodiment, vector instructions operation on 128-bit vectors and the quantized coefficients are 16-bit values. The factoring allows these operations to be performed on eight quantized elements at a time. In alternate embodiments, different sized vectors and/or different sized coefficients can also be supported.

Starting with two sets of eight vectors, W and X, with
$W_1 = (2^{13}\ 2^{11}\ 2^{15}\ 2^{15}\ 2^{15}\ 2^{15}\ 2^{15}\ 2^{14})$
$W_2 = (2^{12}\ 2^9\ 2^{15}\ 2^{13}\ 2^{15}\ 2^{15}\ 2^{15}\ 2^{13})$
$W_3 = (2^8\ 2^6\ 2^{12}\ 2^6\ 2^{15}\ 2^5\ 2^{12}\ 2^1)$
$W_4 = (2^7\ 2^0\ 2^7\ 2^0\ 2^6\ 2^0\ 2^2\ 2^0)$
$W_5 = (2^{15}\ 2^{15}\ 2^{15}\ 2^{15}\ 2^{15}\ 2^{15}\ 2^{13}\ 2^6)$
$W_6 = (2^{15}\ 2^{15}\ 2^{15}\ 2^{13}\ 2^{15}\ 2^{12}\ 2^7\ 2^5)$
$W_7 = (2^{15}\ 2^{13}\ 2^{12}\ 2^9\ 2^{11}\ 2^8\ 2^4\ 2^1)$
$W_8 = (2^{14}\ 2^0\ 2^{10}\ 2^0\ 2^9\ 2^3\ 2^2\ 2^0)$
$X_1 = (2^0\ 2^0\ 2^6\ 2^0\ 2^{13}\ 2^3\ 2^{13}\ 2^0)$
$X_2 = (2^0\ 2^0\ 2^1\ 2^0\ 2^4\ 2^1\ 2^0\ 2^0)$
$X_3 = (2^0\ 2^0\ 2^0\ 2^0\ 2^0\ 2^0\ 2^0\ 2^0)$
$X_4 = (2^0\ 2^0\ 2^0\ 2^0\ 2^0\ 2^0\ 2^0\ 2^0)$
$X_5 = (2^{13}\ 2^{11}\ 2^{13}\ 2^7\ 2^9\ 2^2\ 2^0\ 2^0)$
$X_6 = (2^{12}\ 2^1\ 2^8\ 2^0\ 2^3\ 2^0\ 2^0\ 2^0)$ $X_7 = (2^0\ 2^0\ 2^0\ 2^0\ 2^0\ 2^0\ 2^0\ 2^0)$ $X_8 = (2^0\ 2^0\ 2^0\ 2^0\ 2^0\ 2^0\ 2^0\ 2^0)$ Given a matrix Q of quantized coefficients represented by row vectors $\{Q_1 \ldots Q_n\}$ the elements of each $W_n$ are zeroed out for every corresponding zero element of $Q_n$ to create a set of vectors $W'_n$. In one embodiment, the zeroing out of the elements of the vectors $W_n$ is performed at the quantization phase of MPEG encoding. The result of each quantization operation is used to determine whether each element of the vector $W_n$ should be clear or set. In one embodiment, the result of the DCT operation is used to determine whether the coefficient will be zero or non-zero after the quantization operation. For example, if a coefficient is below a threshold value before quantization, that coefficient will be zero after quantization. In one embodiment, vector compare and vector select instructions are used; however, other instructions can also be used depending on the architecture used.

Multiply-sum operations are performed on vectors $X_n$ and $W'_n$ such that the following vectors are produced.

$$V_1 = \sum_{i=1}^{4} (X_{1i}W'_{1i} + X_{2i}W'_{2i} + X_{3i}W'_{3i} + \ldots + X_{7i}W'_{7i} + X_{8i}W'_{8i})$$

$$V_2 = \sum_{i=5}^{8} (X_{1i}W'_{1i} + X_{2i}W'_{2i} + X_{3i}W'_{3i} + \ldots + X_{7i}W'_{7i} + X_{8i}W'_{8i})$$

where the summation symbol operates componentwise (i.e., each component is a sum of eight XW' products. Using the vector architecture described above, the generation of all $W'_n$ and subsequent calculation of $V_1$ and $V_2$ requires 24 instructions, which averages 0.375 instructions per coefficient.

Using 64-bit arithmetic, the following is performed:

$$T = \sum_{i=1}^{4} V_{1,i} * 2^{bi} + V_{2,i} * 2^{bi+4}$$

which can be calculated using only shifts and bitwise OR operations. The result, T, is the sum of the bitmask. Having the bitmask allows simplified determination of the run lengths of zeros by counting the leading zeros. When non-zero elements are indicated by the bitmask, the non-zero elements can be retrieved from memory using a lookup table. The bitmask also allows an early abort when all remaining coefficients are zero rather than the exhaustive scan that would otherwise be required.

Control circuit 250 receives the quantization mask(s) and causes run/level encoder 220 to retrieve the non-zero coefficients from memory 210. In one embodiment, control circuit 250 counts leading zeros in the quantization mask(s) and identifies the non-zero position of coefficient that terminates the run of zeros within the macroblock. Control circuit 250 causes run/level encoder 220 to retrieve the non-zero entry from memory. Run/level encoder 220 uses the number of leading zeros and the non-zero coefficient to run/level encode the coefficient.

Run/level codes can be retrieved from run/level code table 150 or run/level codes can be derived by run/level encoder 220. Run/level encoder 220 generates a MPEG-encoded bit stream.

The components of FIG. 2 can be implemented as any combination of hardware and/or software. For example, the transformations (DCT, quantization, zig-zag) can be performed by special-purpose hardware (e.g., an ASIC) or by a general-purpose processor executing instructions. In one embodiment, the encoding process is performed by a general-purpose processor capable of operating on vector data, for example, the G4 processor available from Motorola.

Figure 3:
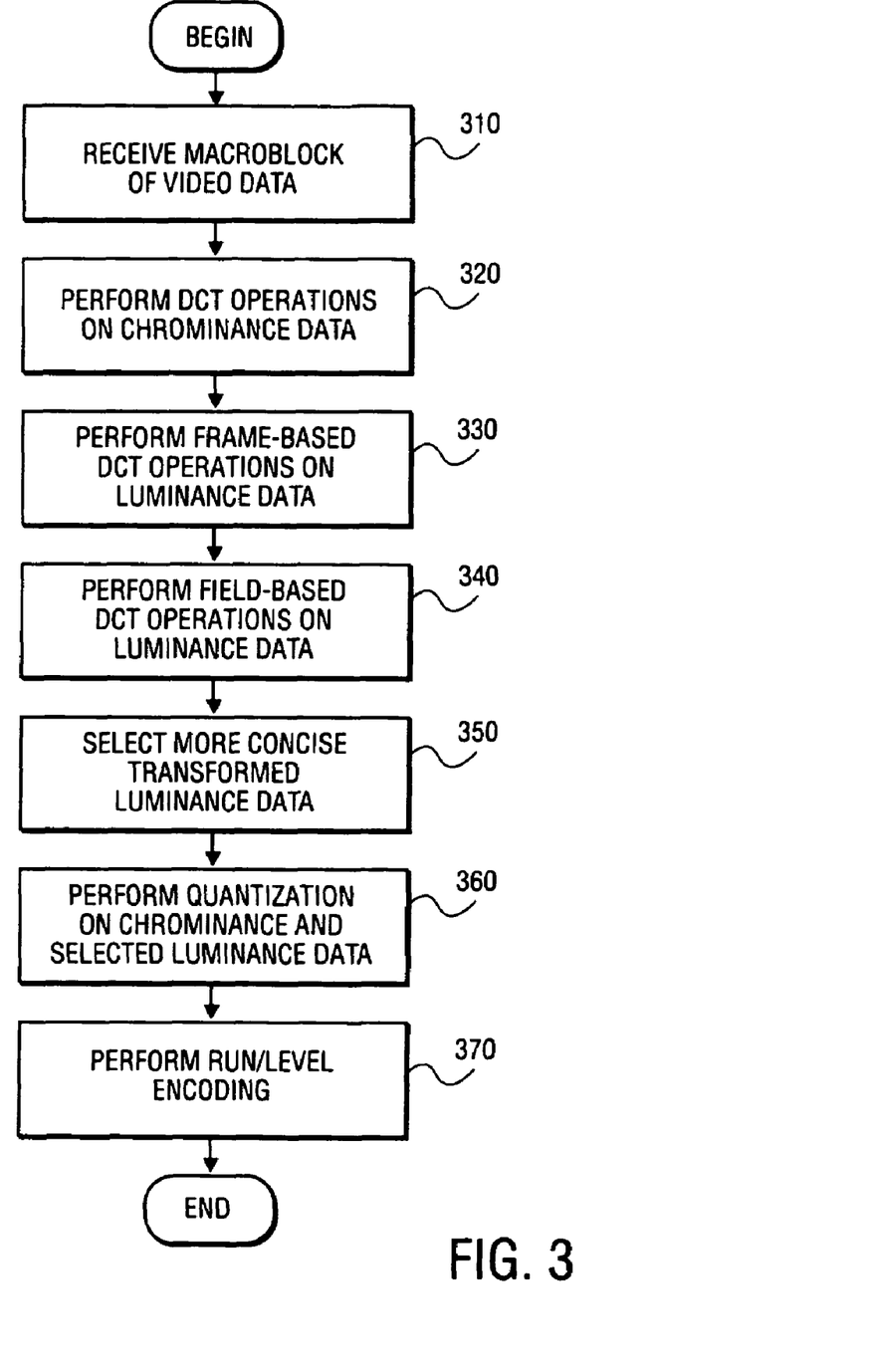
FIG. 3 is a flow diagram of one embodiment of generation of a mask to indicate non-zero entries in a zig-zag transformed array of quantized video data coefficients.

FIG. 3 is a flow diagram of one embodiment of generation of a mask to indicate non-zero entries in a zig-zag transformed array of quantized video data coefficients. DCT operations are performed on a macroblock of data, 310. Quantization operations are performed on the results of the DCT operations, 320. In one embodiment, the results of the quantization operation are used to set entries in a vector to indicate whether the corresponding coefficient is zero or non-zero, 330. In an alternate embodiment, the vector entries are determined based on the results of the DCT operations.

One or more vectors having entries set based on the results of the DCT/quantization operation are used to generate a mask that indicates the location of non-zero coefficients, 340. The mask can be generated using the vector operations described above, or the mask can be generated using a different technique.

The coefficient location mask(s) is used to access memory to retrieve non-zero coefficients for run/level encoding, 350. The retrieved coefficients along with the number of zero coefficients preceding the non-zero coefficient in the zig-zag transformed macroblock of coefficients is used for run/level encoding, 360. The run/level encoded data is MPEG-encoded video data.

Figure 4:
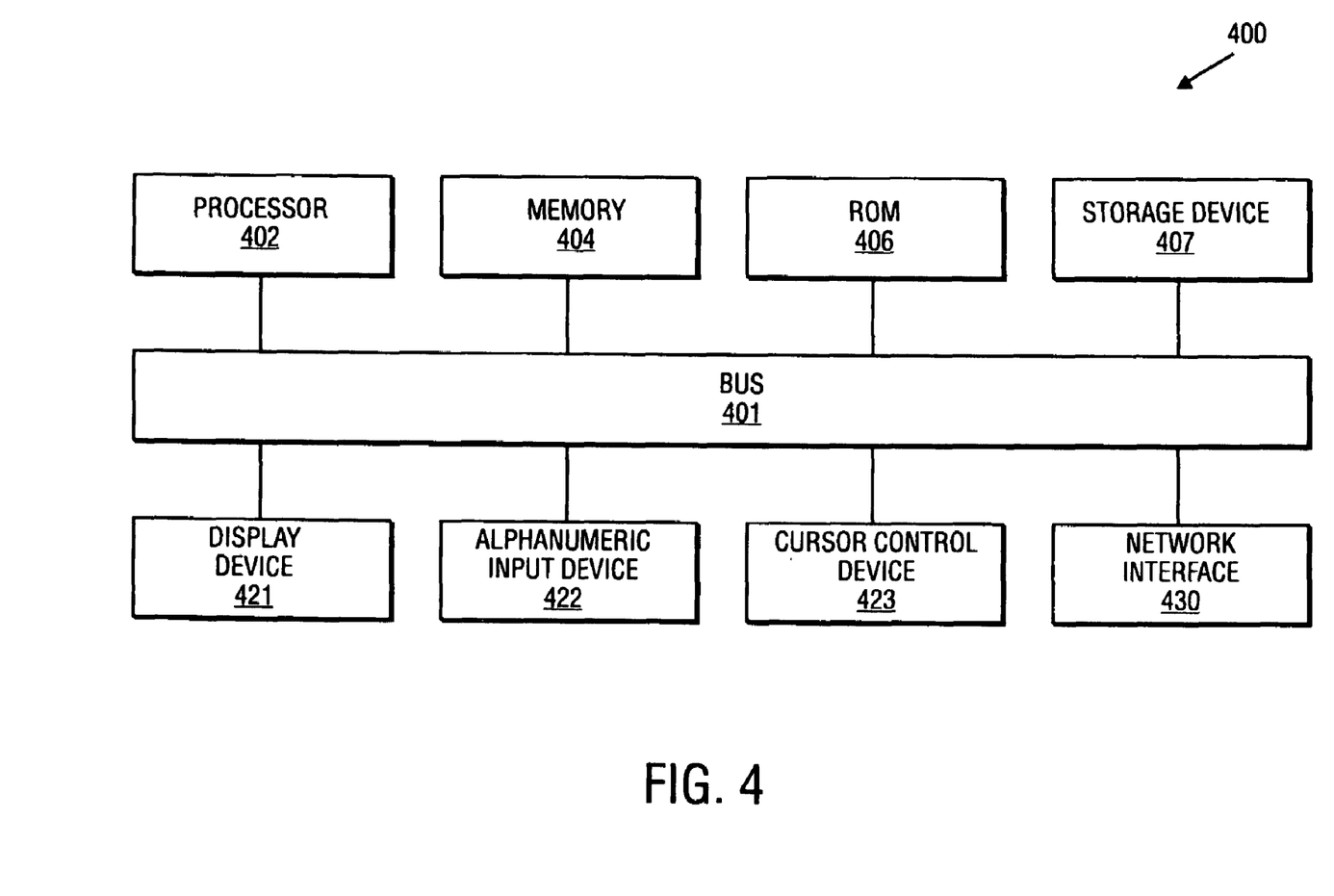
FIG. 4 is a block diagram of one embodiment of an electronic system.

In one embodiment, some or all of the technique of FIGS. 2 and 3 can be implemented as sequences of instructions executed by an electronic system. The sequences of instructions can be stored by the electronic device or the instructions can be received by the electronic device (e.g., via a network connection). FIG. 4 is a block diagram of one embodiment of an electronic system. The electronic system illustrated in FIG. 2 is intended to represent a range of electronic systems, for example, computer systems, network access devices, etc. Alternative electronic systems can include more, fewer and/or different components.

Electronic system 400 includes bus 401 or other communication device to communicate information, and processor 402 coupled to bus 401 to process information. While electronic system 400 is illustrated with a single processor, electronic system 400 can include multiple processors and/or co-processors. Electronic system 400 further includes random access memory (RAM) or other dynamic storage device 404 (referred to as memory), coupled to bus 401 to store information and instructions to be executed by processor 402. Memory 404 also can be used to store temporary variables or other intermediate information during execution of instructions by processor 402.

Electronic system 400 also includes read only memory (ROM) and/or other static storage device 406 coupled to bus 401 to store static information and instructions for processor 402. Data storage device 407 is coupled to bus 401 to store information and instructions. Data storage device 407 such as a magnetic disk or optical disc and corresponding drive can be coupled to electronic system 400.

Electronic system 400 can also be coupled via bus 401 to display device 421, such as a cathode ray tube (CRT) or liquid crystal display (LCD), to display information to a computer user. Alphanumeric input device 422, including alphanumeric and other keys, is typically coupled to bus 401 to communicate information and command selections to processor 402. Another type of user input device is cursor control 423, such as a mouse, a trackball, or cursor direction keys to communicate direction information and command selections to processor 402 and to control cursor movement on display 421. Electronic system 400 further includes network interface 430 to provide access to a network, such as a local area network.

Instructions are provided to memory from a storage device, such as magnetic disk, a read-only memory (ROM) integrated circuit, CD-ROM, DVD, via a remote connection (e.g., over a network via network interface 430) that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

An electronically-accessible medium includes any mechanism that provides (i.e., stores) content (e.g., computer executable instructions) in a form readable by an electronic device (e.g., a computer, a personal digital assistant, a cellular telephone). A machine-accessible medium includes read only memory (ROM); random access memory (RAM); magnetic disk storage media; optical storage media; flash memory devices.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
    transforming a set of n coefficients representing video data from a zig-zag order to a second order, n is an integer greater than 1;
    generating an n-bit mask indicating whether the individual coefficients in the second order are non-zero;
    determining using the mask, a number of leading zero coefficients for the non-zero coefficients;
    storing the mask as one or more vectors, wherein the stored vectors are factored so that the sum of the mask can be determined using only shift and bitwise OR operations;
    retrieving the non-zero coefficients;
    encoding, by an encoder, the set of coefficients based on the number of leading zero coefficients determined from the mask and corresponding non-zero entries; and
    transmitting the encoded set of coefficients in an encoded video bitstream.

2. The method of claim 1 wherein the transforming of the set of coefficients from a first order to a second order comprises transforming the zig-zag ordering of a set of coefficients corresponding to a macroblock of video data to a transposed zig-zag ordering of the set of coefficients.

3. The method of claim 2 wherein transforming the set of coefficients representing video data from the zig-zag order to the second order comprises transforming a matrix having an original order of $$Z = \begin{bmatrix} 0 & 1 & 5 & 6 & 14 & 15 & 27 & 28 \\ 2 & 4 & 7 & 13 & 16 & 26 & 29 & 42 \\ 3 & 8 & 12 & 17 & 25 & 30 & 41 & 43 \\ 9 & 11 & 18 & 24 & 31 & 40 & 44 & 53 \\ 10 & 19 & 23 & 32 & 39 & 45 & 52 & 54 \\ 20 & 22 & 33 & 38 & 46 & 51 & 55 & 60 \\ 21 & 34 & 37 & 47 & 50 & 56 & 59 & 61 \\ 35 & 36 & 48 & 49 & 57 & 58 & 62 & 63 \end{bmatrix}$$

to a matrix having an order of $$Z' = \begin{bmatrix} 0 & 2 & 3 & 9 & 10 & 20 & 21 & 35 \\ 1 & 4 & 8 & 11 & 19 & 22 & 34 & 36 \\ 5 & 7 & 12 & 18 & 23 & 33 & 37 & 48 \\ 6 & 13 & 17 & 24 & 32 & 38 & 47 & 49 \\ 14 & 16 & 25 & 31 & 39 & 46 & 50 & 57 \\ 15 & 26 & 30 & 40 & 45 & 51 & 56 & 58 \\ 27 & 29 & 41 & 44 & 52 & 55 & 59 & 62 \\ 28 & 42 & 43 & 53 & 54 & 60 & 61 & 63 \end{bmatrix}.$$

4. The method of claim 1 wherein the mask comprises a 64-bit value where each bit in the mask corresponds to a coefficient in a discrete cosine transformed macroblock of video data.

5. The method of claim 1 wherein the mask comprises a 64-bit value where each bit in the mask corresponds to a coefficient in a discrete cosine transformed and quantized macroblock of video data.

6. The method of claim 1 wherein retrieving the non-zero coefficients comprises accessing memory locations storing the set of coefficients only to retrieve non-zero coefficients.

7. The method of claim 1 wherein generating the mask comprises:
    determining whether a coefficient exceeds a predetermined threshold value; and
    generating an entry in a vector to be used in computing the mask, the entry corresponding to the location of the coefficient within the macroblock that exceeds the predetermined threshold value.

8. The method of claim 7 wherein the coefficient comprises a quantized coefficient.

9. A machine-accessible medium stored computer executable instructions that, when executed, cause one or more processors to:
    transform a set of n coefficients representing video data from a zig-zag order to a second order;
    generate an n-bit mask indicating whether the individual coefficients in the second order are non-zero, n is an integer greater than 1;
    determine using the mask, a number of leading zero coefficients for the non-zero coefficients;
    store the mask as one or more vectors, wherein the stored vectors are factored so that the sum of the mask can be determined using only shift and bitwise OR operations;
    retrieve the non-zero coefficients;
    encode the set of coefficients based on the number of leading zero coefficients determined from the mask and corresponding non-zero entries; and
    transmit the encoded set of coefficients in an encoded video bitstream.

10. The machine accessible medium of claim 9 wherein the computer executable instructions that cause the one or more processors to transform the set of coefficients from a first order to a second order comprises instructions that, when executed, cause the one or more processors to transform the zig-zag ordering of a set of coefficients corresponding to a macroblock of video data to a transposed zig-zag ordering of the set of coefficients.

11. The machine accessible medium of claim 10 wherein transforming the set of coefficients representing video data from the zig-zag order to the second order comprises transforming a matrix having an original order of $$Z = \begin{bmatrix} 0 & 1 & 5 & 6 & 14 & 15 & 27 & 28 \\ 2 & 4 & 7 & 13 & 16 & 26 & 29 & 42 \\ 3 & 8 & 12 & 17 & 25 & 30 & 41 & 43 \\ 9 & 11 & 18 & 24 & 31 & 40 & 44 & 53 \\ 10 & 19 & 23 & 32 & 39 & 45 & 52 & 54 \\ 20 & 22 & 33 & 38 & 46 & 51 & 55 & 60 \\ 21 & 34 & 37 & 47 & 50 & 56 & 59 & 61 \\ 35 & 36 & 48 & 49 & 57 & 58 & 62 & 63 \end{bmatrix}$$

to a matrix having an order of $$Z' = \begin{bmatrix} 0 & 2 & 3 & 9 & 10 & 20 & 21 & 35 \\ 1 & 4 & 8 & 11 & 19 & 22 & 34 & 36 \\ 5 & 7 & 12 & 18 & 23 & 33 & 37 & 48 \\ 6 & 13 & 17 & 24 & 32 & 38 & 47 & 49 \\ 14 & 16 & 25 & 31 & 39 & 46 & 50 & 57 \\ 15 & 26 & 30 & 40 & 45 & 51 & 56 & 58 \\ 27 & 29 & 41 & 44 & 52 & 55 & 59 & 62 \\ 28 & 42 & 43 & 53 & 54 & 60 & 61 & 63 \end{bmatrix}.$$

12. The machine accessible medium of claim 9 wherein the mask comprises a 64-bit value where each bit in the mask corresponds to a coefficient in a discrete cosine transformed macroblock of video data.

13. The machine accessible medium of claim 9 wherein the mask comprises a 64-bit value where each bit in the mask corresponds to a coefficient in a discrete cosine transformed and quantized macroblock of video data.

14. The machine accessible medium of claim 9 wherein the instructions that cause the one or more processors to retrieve the non-zero coefficients comprises instructions that, when executed, cause the one or more processors to access memory locations storing the set of coefficients only to retrieve non-zero coefficients.

15. The machine accessible medium of claim 9 wherein the instructions that cause the one or more processors to generate the mask comprises instructions that, when executed, cause the one or more processors to:
   determine whether a coefficient exceeds a predetermined threshold value; and
   generate an entry in a vector to be used in computing the mask, the entry corresponding to the location of the coefficient within the macroblock that exceeds the predetermined threshold value.

16. The machine accessible medium of claim 15 wherein the coefficient comprises a quantized coefficient.

17. An apparatus comprising:
   means for transforming a set of n coefficients representing video data from a zig-zag order to a second order;
   means for generating an n-bit mask indicating whether the individual coefficients in the second order are non-zero, n is an integer greater than 1;
   means for determining using the mask, a number of leading zero coefficients for the non-zero coefficients;
   means for storing the mask as one or more vectors, wherein the stored vectors are factored so that the sum of the mask can be determined using only shift and bitwise OR operations;
   means for retrieving the non-zero coefficients;
   means for encoding the set of coefficients based on the number of leading zero coefficients determined from the mask and corresponding non-zero entries; and
   means for transmitting the encoded set of coefficients in an encoded video bitstream.

18. The apparatus of claim 17 wherein transforming the set of coefficients representing video data from the zig-zag order to the second order comprises transforming a matrix having an original order of $$Z = \begin{bmatrix} 0 & 1 & 5 & 6 & 14 & 15 & 27 & 28 \\ 2 & 4 & 7 & 13 & 16 & 26 & 29 & 42 \\ 3 & 8 & 12 & 17 & 25 & 30 & 41 & 43 \\ 9 & 11 & 18 & 24 & 31 & 40 & 44 & 53 \\ 10 & 19 & 23 & 32 & 39 & 45 & 52 & 54 \\ 20 & 22 & 33 & 38 & 46 & 51 & 55 & 60 \\ 21 & 34 & 37 & 47 & 50 & 56 & 59 & 61 \\ 35 & 36 & 48 & 49 & 57 & 58 & 62 & 63 \end{bmatrix}$$

to a matrix having an order of $$Z' = \begin{bmatrix} 0 & 2 & 3 & 9 & 10 & 20 & 21 & 35 \\ 1 & 4 & 8 & 11 & 19 & 22 & 34 & 36 \\ 5 & 7 & 12 & 18 & 23 & 33 & 37 & 48 \\ 6 & 13 & 17 & 24 & 32 & 38 & 47 & 49 \\ 14 & 16 & 25 & 31 & 39 & 46 & 50 & 57 \\ 15 & 26 & 30 & 40 & 45 & 51 & 56 & 58 \\ 27 & 29 & 41 & 44 & 52 & 55 & 59 & 62 \\ 28 & 42 & 43 & 53 & 54 & 60 & 61 & 63 \end{bmatrix}.$$

19. The apparatus of claim 17 wherein the mask comprises a 64-bit value where each bit in the mask corresponds to a coefficient in a discrete cosine transformed macroblock of video data.

20. The apparatus of claim 17 wherein the mask comprises a 64-bit value where each bit in the mask corresponds to a coefficient in a discrete cosine transformed and quantized macroblock of video data.

21. The apparatus of claim 17 wherein the means for retrieving the non-zero coefficients comprises means for accessing memory locations storing the set of coefficients only to retrieve non-zero coefficients.

22. The apparatus of claim 17 wherein the means for generating the mask comprises:
   means for determining whether a coefficient exceeds a predetermined threshold value; and
   means for generating an entry in a vector to be used in computing the mask, the entry corresponding to the location of the coefficient within the macroblock that exceeds the predetermined threshold value.

23. The apparatus of claim 22 wherein the coefficient comprises a quantized coefficient.

24. A system comprising:
   a memory;
   one or more processors coupled with the memory, the one or more processors to transform a set of coefficients representing video data from a zig-zag order to a second order, generate a mask indicating whether the individual coefficients in the second order are non-zero, determine using the mask, a number of leading zero coefficients for the non-zero coefficients, store the mask as one or more vectors, wherein the stored vectors are factored so that the sum of the mask can be determined using only shift and bitwise OR operations, retrieve the non-zero coefficients, encode the set of coefficients based on the number of leading zero coefficients determined from the mask and corresponding non-zero entries, and transmit the encoded set of coefficients in an encoded video bitstream.

25. The system of claim 24 wherein transforming the set of coefficients representing video data from the zig-zag order to the second order comprises transforming a matrix having an original order of $$Z = \begin{bmatrix} 0 & 1 & 5 & 6 & 14 & 15 & 27 & 28 \\ 2 & 4 & 7 & 13 & 16 & 26 & 29 & 42 \\ 3 & 8 & 12 & 17 & 25 & 30 & 41 & 43 \\ 9 & 11 & 18 & 24 & 31 & 40 & 44 & 53 \\ 10 & 19 & 23 & 32 & 39 & 45 & 52 & 54 \\ 20 & 22 & 33 & 38 & 46 & 51 & 55 & 60 \\ 21 & 34 & 37 & 47 & 50 & 56 & 59 & 61 \\ 35 & 36 & 48 & 49 & 57 & 58 & 62 & 63 \end{bmatrix}$$

to a matrix having an order of $$Z' = \begin{bmatrix} 0 & 2 & 3 & 9 & 10 & 20 & 21 & 35 \\ 1 & 4 & 8 & 11 & 19 & 22 & 34 & 36 \\ 5 & 7 & 12 & 18 & 23 & 33 & 37 & 48 \\ 6 & 13 & 17 & 24 & 32 & 38 & 47 & 49 \\ 14 & 16 & 25 & 31 & 39 & 46 & 50 & 57 \\ 15 & 26 & 30 & 40 & 45 & 51 & 56 & 58 \\ 27 & 29 & 41 & 44 & 52 & 55 & 59 & 62 \\ 28 & 42 & 43 & 53 & 54 & 60 & 61 & 63 \end{bmatrix}.$$

26. The system of claim 24 wherein the mask comprises a 64-bit value where each bit in the mask corresponds to a coefficient in a discrete cosine transformed macroblock of video data.

27. The system of claim 24 wherein the mask comprises a 64-bit value where each bit in the mask corresponds to a coefficient in a discrete cosine transformed and quantized macroblock of video data.

28. The system of claim 24 wherein the one or more processors retrieving the non-zero coefficients comprises the one or more processors to accessing memory locations storing the set of coefficients only to retrieve non-zero coefficients.

29. The system of claim 24 wherein the one or more processors generating the mask comprises the one or more processors determining whether a coefficient exceeds a predetermined threshold value, and generating an entry in a vector to be used in computing the mask, the entry corresponding to the location of the coefficient within the macroblock that exceeds the predetermined threshold value.

30. The system of claim 29 wherein the coefficient comprises a quantized coefficient.

\* \* \* \* \*